(12) United States Patent
Mason et al.

(10) Patent No.: US 9,432,951 B2
(45) Date of Patent: Aug. 30, 2016

(54) TRANSMIT POWER CONTROL ALGORITHMS FOR SOURCES AND SINKS IN A MULTI-LINK SESSION

(75) Inventors: Ralph D. Mason, Ottawa (CA); Renyuan Li, Ottawa (CA)

(73) Assignee: SMSC HOLDINGS S.A.R.L., Luxembourg (LU)

( * ) Notice: Subject to any disclaimer, the term of this patent is extended or adjusted under 35 U.S.C. 154(b) by 607 days.

(21) Appl. No.: 13/097,736

(22) Filed: Apr. 29, 2011

(65) Prior Publication Data

US 2012/0276942 A1    Nov. 1, 2012

(51) Int. Cl.
*H04W 52/24* (2009.01)
*H04B 17/318* (2015.01)
*H04W 52/48* (2009.01)

(52) U.S. Cl.
CPC ......... *H04W 52/245* (2013.01); *H04B 17/318* (2015.01); *H04W 52/48* (2013.01); *Y02B 60/50* (2013.01)

(58) Field of Classification Search
CPC  H04B 7/0413; H04B 17/318; H04B 52/244; H04W 16/28; H04W 52/245; H04W 52/02
USPC .................................................. 455/522, 500
See application file for complete search history.

(56) References Cited

U.S. PATENT DOCUMENTS

| | | | |
|---|---|---|---|
| 5,960,361 A * | 9/1999 | Chen ................... | H04W 52/362 455/522 |
| 6,308,080 B1 | 10/2001 | Burt et al. | |
| 6,463,290 B1 * | 10/2002 | Stilp ......................... | G01S 5/02 455/456.1 |
| 6,493,541 B1 * | 12/2002 | Gunnarsson ........ | H04W 52/221 375/346 |
| 7,010,318 B2 * | 3/2006 | Chang ................. | H04W 52/262 370/331 |
| 7,082,108 B2 * | 7/2006 | Hwang ................. | H04W 52/56 370/311 |
| 7,200,127 B1 * | 4/2007 | Lee ......................... | G01S 11/02 370/320 |
| 7,324,785 B2 | 1/2008 | Hansen et al. | |
| 7,418,244 B2 | 8/2008 | Montalvo | |
| 7,450,522 B2 * | 11/2008 | Feder .................... | H04W 52/08 370/252 |
| 7,583,976 B2 * | 9/2009 | Batra .................... | H04W 52/08 455/127.1 |
| 7,647,050 B2 * | 1/2010 | Dominique ........... | H04W 52/40 455/437 |
| 7,729,722 B2 * | 6/2010 | Rofougaran ........... | H04B 1/406 455/260 |
| 7,764,966 B2 * | 7/2010 | Derryberry ........... | H04W 52/54 370/329 |

(Continued)

*Primary Examiner* — Hai V Nguyen
(74) *Attorney, Agent, or Firm* — Slayden Grubert Beard PLLC

(57) ABSTRACT

Transmit power control functionality in wireless audio systems may be implemented by way of a Transmit Power Control (TPC) algorithm devised to control power for both source and sinks in a multi sink session, to reduce power consumption. Information may be passed back and forth between the source and sink devices to adjust power based on the shared information. The TPC algorithm may allow power control on both ends of an RF link, and may have multiple sink devices communicating with a source device. Furthermore, the multiple sink devices and the source device may each be operating at different power levels, and adjust their respective power levels as instructed by the TPC algorithm. Power control is therefore implemented on both ends of the link, where multiple sources and sinks may all operate at different power levels, and all individually adjust their respective power levels.

14 Claims, 9 Drawing Sheets

(56) References Cited

U.S. PATENT DOCUMENTS

| | | | | |
|---|---|---|---|---|
| 7,844,242 B2* | 11/2010 | Rofougaran | H04B 1/0067 | 455/333 |
| 7,949,309 B2* | 5/2011 | Rofougaran | H01Q 21/061 | 455/125 |
| 7,957,760 B2* | 6/2011 | Batra | H04W 52/08 | 455/127.1 |
| 8,089,887 B2* | 1/2012 | Lippman | H04L 1/18 | 370/246 |
| 8,107,989 B2* | 1/2012 | Budampati | H04W 52/08 | 370/208 |
| 8,170,617 B2* | 5/2012 | Nassiri-Toussi | H04B 7/0408 | 375/299 |
| 8,232,925 B2* | 7/2012 | Knudsen | H01Q 1/241 | 343/702 |
| 8,284,747 B1* | 10/2012 | Chhabra | H04W 52/18 | 370/318 |
| 8,405,568 B2* | 3/2013 | Knudsen | H01Q 5/35 | 343/861 |
| 8,570,997 B1* | 10/2013 | Chhabra | H04W 48/20 | 370/318 |
| 8,615,209 B1* | 12/2013 | Khlat | H04W 52/30 | 455/126 |
| 8,792,848 B2* | 7/2014 | Rofougaran | H04B 1/0067 | 455/333 |
| 8,982,801 B2* | 3/2015 | Shin | H04W 52/146 | 370/311 |
| 2002/0042256 A1* | 4/2002 | Baldwin | H03D 3/008 | 455/232.1 |
| 2002/0136193 A1* | 9/2002 | Chang | H04W 52/262 | 370/347 |
| 2002/0196766 A1* | 12/2002 | Hwang | H04W 52/56 | 370/342 |
| 2003/0104831 A1* | 6/2003 | Razavilar | H04L 1/0002 | 455/522 |
| 2003/0169700 A1* | 9/2003 | Nilsson | H04W 24/06 | 370/318 |
| 2004/0095920 A1* | 5/2004 | Lippman | H04L 1/18 | 370/351 |
| 2005/0239491 A1* | 10/2005 | Feder | H04W 52/08 | 455/522 |
| 2006/0128410 A1* | 6/2006 | Derryberry | H04W 52/54 | 455/509 |
| 2006/0193273 A1* | 8/2006 | Passier | G08C 17/02 | 370/310 |
| 2006/0205349 A1* | 9/2006 | Passier | H04R 27/00 | 455/41.2 |
| 2007/0099644 A1* | 5/2007 | Batra | H04W 52/08 | 455/522 |
| 2007/0149201 A1* | 6/2007 | Dominique | H04W 52/40 | 455/442 |
| 2007/0199029 A1* | 8/2007 | Kim | H04L 12/12 | 725/81 |
| 2007/0253352 A1* | 11/2007 | Arisha | H04W 52/245 | 370/328 |
| 2008/0081655 A1* | 4/2008 | Shin | H04W 52/08 | 455/522 |
| 2008/0240031 A1* | 10/2008 | Nassiri-Toussi | H04B 7/0408 | 370/329 |
| 2008/0242237 A1* | 10/2008 | Rofougaran | H01Q 21/061 | 455/77 |
| 2008/0242240 A1* | 10/2008 | Rofougaran | H04B 1/406 | 455/86 |
| 2008/0242346 A1* | 10/2008 | Rofougaran | H04B 1/0067 | 455/552.1 |
| 2008/0259846 A1* | 10/2008 | Gonikberg | H04W 72/1215 | 370/328 |
| 2008/0293363 A1* | 11/2008 | Olgaard | H04B 17/29 | 455/67.7 |
| 2009/0046667 A1* | 2/2009 | Pelletier | H04W 52/286 | 370/335 |
| 2009/0156990 A1* | 6/2009 | Wenger | A61M 5/14244 | 604/67 |
| 2009/0168677 A1* | 7/2009 | Kang | H04W 52/08 | 370/311 |
| 2009/0201885 A1* | 8/2009 | Kuroda | H04L 5/0091 | 370/335 |
| 2009/0280857 A1* | 11/2009 | Batra | H04W 52/08 | 455/522 |
| 2010/0004016 A1* | 1/2010 | Yin | H04W 52/08 | 455/522 |
| 2010/0029317 A1* | 2/2010 | Budampati | H04W 52/08 | 455/522 |
| 2010/0086012 A1* | 4/2010 | Rofougaran | H04B 1/406 | 375/219 |
| 2010/0232474 A1* | 9/2010 | Rofougaran | H01Q 21/061 | 375/135 |
| 2010/0302106 A1* | 12/2010 | Knudsen | H01Q 1/241 | 343/702 |
| 2010/0302123 A1* | 12/2010 | Knudsen | H01Q 5/35 | 343/861 |
| 2011/0034133 A1* | 2/2011 | Rofougaran | H04B 1/0067 | 455/77 |
| 2011/0038271 A1* | 2/2011 | Shin | H04W 52/146 | 370/252 |
| 2011/0044296 A1* | 2/2011 | Zhang | H04B 7/0404 | 370/336 |
| 2011/0159911 A1* | 6/2011 | Chen | H04W 52/221 | 455/522 |
| 2011/0167291 A1* | 7/2011 | Liu | H04W 52/20 | 713/340 |
| 2011/0256871 A1* | 10/2011 | Cooper | H04L 1/1877 | 455/436 |
| 2012/0170514 A1* | 7/2012 | Lo | H04W 52/262 | 370/328 |
| 2012/0218926 A1* | 8/2012 | Wang | H04W 52/0216 | 370/311 |
| 2013/0044680 A1* | 2/2013 | Abraham | H04W 16/14 | 370/328 |
| 2013/0044681 A1* | 2/2013 | Abraham | H04L 1/0002 | 370/328 |
| 2013/0148517 A1* | 6/2013 | Abraham | H04B 7/12 | 370/252 |
| 2013/0178221 A1* | 7/2013 | Jung | H04L 9/0844 | 455/450 |
| 2013/0310116 A1* | 11/2013 | Rofougaran | H04W 52/0261 | 455/572 |
| 2014/0057580 A1* | 2/2014 | Rofougaran | H04B 1/0067 | 455/77 |
| 2014/0140274 A1* | 5/2014 | Kuroda | H04L 5/0091 | 370/328 |
| 2015/0189601 A1* | 7/2015 | Shin | H04W 52/146 | 370/252 |

* cited by examiner

| Variable | Type & Init. Value | Description |
|---|---|---|
| SRC_ACK_det_flag | UB 0x00 | Indicates if ACKs have been received from SNKs. One bit per SNK. A "1" indicates that an ACK was received. |
| SRC_RSSI_level_good_flag | UB 0x00 | Indicates if the RSSI level of an ACK received by the SRC is above a predefined threshold. One bit per SNK. A "1" indicates that the ACK RSSI level was good |
| SNK_RSSI_level_good_flag | UB 0x00 | Indicates if the RSSI level for the data payload sent to a SNK was above a predefined threshold. One bit per SNK. A 1 indicates that the payload RSSI level was good. SNK_RSSI_level_good_flag bits may come from the ACK packets, or they may be computed |
| RSSI_level | SB N/A | The RSSI level in dBm of an ACK measured by the digital baseband |
| low_tx_pwr_threshold | SB 0xC4 | A predefined threshold level in dBm used to determine if a measured RSSI level is good. (The Initial Value of 0xC4 may correspond to 60dBm) |
| TX_Power | SB N/A | The SRC Transmit power in dBm that was used for the packet that was just sent to the SNKs. The TX_Power is determined based on the Step Index that was used to transmit the packet (e.g. Step 5 = 0dbm, Step 6 = -5dBm etc.) |
| SNK_extended_range | UB N/A | Indicates if the SNK has extended range. One bit per SNK. A "1" indicates that the SNK is extended range |
| SNK_Spec_Device | UB N/A | Indicates if the SNK uses a Specified Device. One bit per SNK. A "1" indicates that the SNK uses the Specified Device. |
| SRC_extended_range | UB N/A | Indicates if the SRC has extended range. A 0x01 indicates that the SRC has extended range |
| SRC_Spec_Device | UB N/A | Indicates if the SRC uses the Specified Device. A 0x01 indicates that the SRC uses the Specified Device. |
| I | UB N/A | Counter to count through the SNKs as they are processed one at a time |
| SRC_tsf_recept_cnt | UB 0x00 | Counter to indicate the number of consecutive TSFs where all ACKs were received correctly. May be thought of as SNK ACK reception counter |
| Step_index | UB 0x00 | The index which indicates which RF power level is to be used for a transmission. |
| Max_Step_index | UB 0xD0 | The maximum index in the RF power level table. This is the lowest RF Transmit power |
| HopInX_cnt | UB N/A | A counter to indicate when channel hopping should begin |
| Power Decrement Threshold (PDT) | UB 0x14 | A predefined threshold used to determine when the Transmit power should be decreased. This is a database element |
| Number of Sinks | UB N/A | The number of SNKs in the sesssion |

UB = Unsigned Byte          SB = Signed Byte

*FIG. 8a*

| Variable | Type & Init. Value | Description |
|---|---|---|
| SRC_ACK_det_flag | UB 0x00 | Indicates if ACK has been received from SNKs by the SRC. One bit per SNK. A "1" indicates that an ACK was received. Sent by the SRC in its data transmission. |
| SRC_RSSI_level_good_flag | UB 0x00 | Indicates if the RSSI level of an ACK received the the SRC is above a predefined threshold. One bit per SNK. A "1" indicates that the ACK RSSI level was good |
| SNK_RSSI_level_good_flag | UB 0x00 | Indicates if the RSSI level for the data packet sent to the SNK was above a predefined threshold. A "1" indicates that the RSSI level was good |
| RSSI_level | SB N/A | The RSSI level in dBm of an ACK measured by the digital baseband |
| RSSI_Thresh | SB 0xC4 | A predefined threshold level in dBm used to determine if a measured RSSI level is good or not. This predefined threshold level is stored as a database element. (The Initial Value of 0xC4 may correspond to 60dBm) |
| SNK_extended range | UB N/A | A "1" indicates that the SNK is extended range |
| SNK_Spec_Device | UB N/A | Indicates if the SNK uses a Specified Device. A "1" indicates that the SNK uses the Specified Device. |
| SRC_extended_range | UB N/A | Indicates if the SRC has extended range. A 0x01 indicates that the SRC is extended range |
| SRC_Spec_Device | UB N/A | Indicates if the SRC uses the Specified Device. A 0x01 indicates that the SRC uses the Specified Device. |
| SNK_TSF_recept_cnt | UB 0x00 | Counter to indicate the number of consectuve good packets received. May be thought of as SRC ACK reception counter |
| Step_Index | UB 0x00 | The index which indicates which RF power level is to be used for a transmission |
| Max_Step_index | UB 0x0D | The maximum index in the RF power level table. This is the lowest RF Transmit power |
| HopInX_cnt | UB N/A | A counter to indicate when channel hopping should begin |
| Power Decrement Threshold (PDT) | UB 0x14 | A predefined threshold used to determine when the Transmit power should be decreased. |

*FIG. 8b*

TRANSMIT POWER CONTROL ALGORITHMS FOR SOURCES AND SINKS IN A MULTI-LINK SESSION

BACKGROUND OF THE INVENTION

1. Field of the Invention

This invention relates to RF transceiver design, and, more particularly, controlling the output power of an RF transmitter.

2. Description of the Related Art

Radio frequency (RF) transmitters/receivers are used in a wide variety of applications, including wireless network interfaces, mobile telephones, and Bluetooth interfaces. RF transceivers also feature prominently in wireless audio technology directed to headphones and earphones, home audio/theater systems and speakers, portable audio/media players and automotive sound systems. Robust, high-quality audio and low-power RF capability can make it possible for consumer and automotive original equipment manufacturers (OEMs) to integrate wireless audio technology into portable audio devices and sound systems. Overall, various RF technologies lend themselves to a number of applications in the consumer world to create high-fidelity home theater environments and distribute audio in the home and other environments.

A radio communication system typically requires tuned circuits at the transmitter and receiver, all tuned to the same frequency. The transmitter is an electronic device that propagates an electromagnetic signal, representative of an audio signal, for example, typically with the aid of an antenna. An RF transceiver is designed to include both a transmitter and a receiver, combined to share common circuitry, many times appearing on the same piece of integrated circuit (IC) chip. If no circuitry is common between transmit and receive functions, the combined device is referred to as a transmitter-receiver. Transceivers usually combine a significant amount of the transmitter and receiver handling circuitry.

RF Transceivers use RF modules for high-speed data transmission. The circuits in a digital RF architecture can operate at frequencies of up to 100 GHz. In most systems, digital processors or processing elements (which are oftentimes software-programmable) are used to perform conversion between digital baseband signals and analog RF, and oscillators are used to generate the required periodic signals. Many RF circuits make use of a voltage-controlled oscillator (VCO), in which the oscillation frequency is controlled by a voltage input, and the oscillation frequency is controlled through an applied DC voltage. Another common element of RF transceivers is the RF power amplifier, which is a type of electronic amplifier used to convert the low-power RF signal into a larger signal of significant power, typically for driving the antenna of the transmitter. RF amplifiers are usually designed to have high efficiency, high output Power compression, good return loss on the input and output, good gain, and optimum heat dissipation. Oftentimes, however, wireless audio systems also have a high demand for low power operation, for example when operating on battery power. In order to prolong the battery life of such a wireless audio system, it is desired to improve the power efficiency of the system.

Other corresponding issues related to the prior art will become apparent to one skilled in the art after comparing such prior art with the present invention as described herein.

SUMMARY OF THE INVENTION

In one set of embodiments, a wireless audio system (which may be implemented as an integrated circuit, or chip) having a transmit path and a receive path may be operating on a high frequency band, e.g. a 2.4 GHz frequency band. A Radio Frequency Power Amplifier (PA) in the transmit path may provide the RF power for signals to be transmitted through an antenna over the air to a corresponding receiver, which may include its own receive path. The RF signal loss in the air may vary considerably. In order to allow the system to operate at a higher path loss, higher output power of the PA may be desired. However, in typical RF designs, any increase of the maximum PA output power may cost a significant increase in the power consumption. Power efficiency may be improved by introducing transmit power control functionality in the wireless audio system. While the RF transmit power block usually consumes most power in a wireless system, it is not always necessary for the wireless audio system (or chip) to operate at the highest RF power. When the channel path loss or channel interference is not high, the transmit PAs may not need to operate at the highest power operation point. The PAs may actually be biased at a lower current point to obtain a lower output power and current of the PA.

To improve coexistence (with nearby devices) and further reduce power consumption, transmit power control functionality may be implemented by way of an algorithm devised to control power for both source and sinks in a multi-sink session. Information may be passed back and forth between source and sink devices to adjust power based on the shared information. Different devices with different power levels may be able to adjust for the power levels of the other source and sink devices, and sinks may also have multiple levels of transmit power (multiple transmit powers) and adjust to operate correctly.

The transmit power control (TPC) algorithm may allow power control on both ends of an RF link, and may have multiple sink devices communicating with a source device. Furthermore, the multiple sink devices and the source device(s) may each be operating at different power levels, and adjust their respective power levels as instructed by the TPC algorithm. In other words, power control is implemented on both ends of the link, where multiple sources and sinks may all operate at different power levels, and all individually adjust their respective power levels. The different source and sink devices may also adjust their respective power levels in a unified way so they can all communicate with each other.

BRIEF DESCRIPTION OF THE DRAWINGS

The foregoing, as well as other objects, features, and advantages of this invention may be more completely understood by reference to the following detailed description when read together with the accompanying drawings in which:

FIG. 8a shows a table containing description of the state variables of the flow chart in FIG. 6; and FIG. 8b shows a table containing description of the state variables of the flow chart in FIG. 7.

Figure 1:
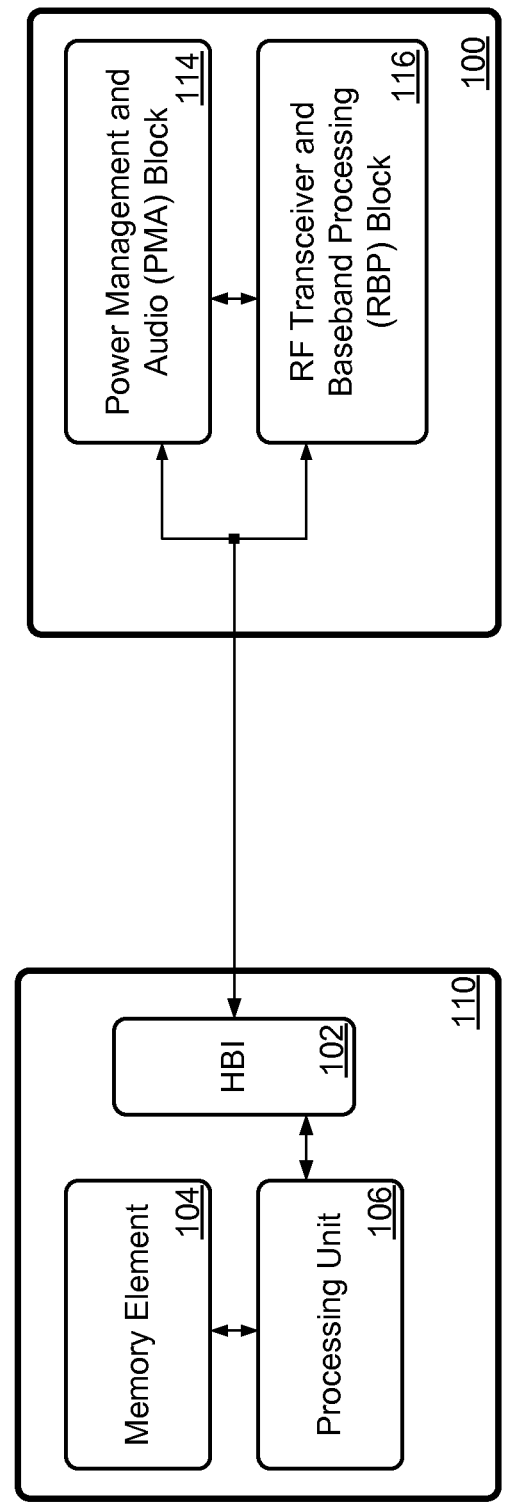
FIG. 1 shows the partial block diagram of one embodiment of a Radio Frequency (RF) system including a host system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 2:
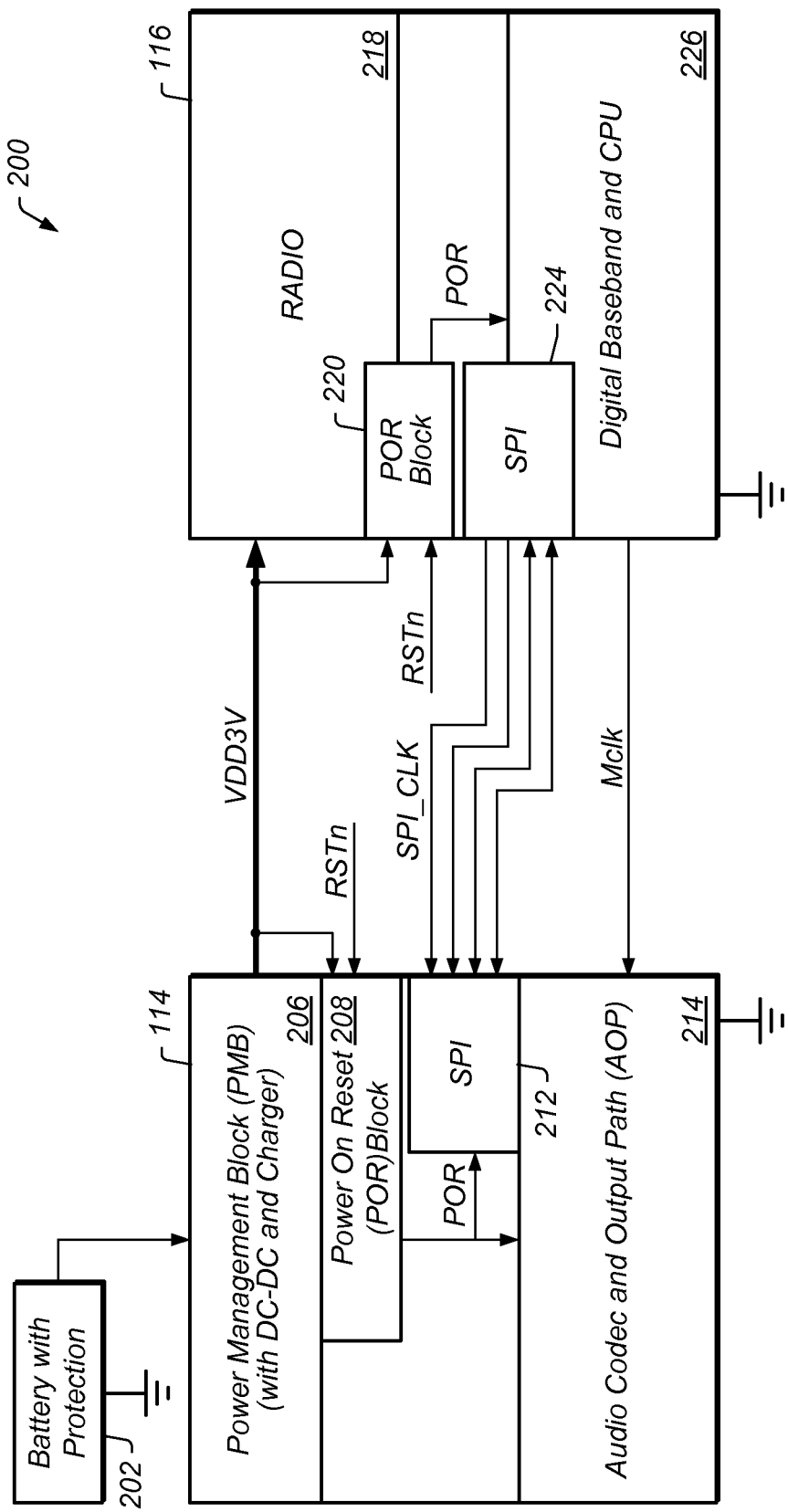
FIG. 2 shows the partial block diagram of one embodiment of an RF transceiver system including a Power Management and Audio (PMA) block and an RF transceiver and Baseband Processing (RBP) block.

FIG. 1 shows the partial block diagram of one embodiment of a wireless audio system that includes a Radio Frequency (RF) transceiver system 100 divided into two main functional components: a Power Management and Audio (PMA) block 114 and an RF Transceiver and Baseband Processing (RBP) block 116. PMA 114 and RBP 116 may each be configured on an Integrated Circuit (IC) or on respective ICs, and may interface with each other via a number of signals (more details of RF transceiver system 100 are shown in FIG. 2 and are discussed in more detail below). PMA 114 and RBP 116 may also couple to components of a host system 110 through a host bus interface (HBI) 102. Host system 110 may include one or more memory elements 104 that can store program code executable by a processing unit 106 (which may be a general purpose central processing unit, or a microcontroller or some similar component) to perform various control operations on RF transceiver system 100. In turn, RF transceiver system 100 may provide certain feedback signals to host system 110 for bidirectional communication between RF transceiver system 100 and host system 110. In some embodiments, RF transceiver system 100 may be designed to be self contained, and perform independently all or most functionality required for RF transceiver system 100 to operate. For example, in one embodiment, RBP 116 may include a microcontroller and memory elements to perform functions that may otherwise be performed under the control of host system 110, and thereby not require host system 110 for performing the necessary RF functions.

As mentioned above, RF transceiver system 100 may include two main components, PMA 114 and RBP 116. PMA 114 itself may include two main blocks as shown in FIG. 2. The first block is a Power Management Block (PMB) 206, and the second block is and Audio Output Path (AOP) 214. PMA 114 may further include a couple of smaller blocks, specifically a Power On Reset (POR) block 208, and a Serial Peripheral Interface (SPI) 212 to exchange data and information with RBP 116. PMB 206 and AOP 214 may be kept functionally separate, though they may be joined by running the AOP supply with the PMB by using a circuit board connection. PMB 206 may include a DC-DC converter, Battery Charger and Button Control Circuitry (not shown/detailed in FIG. 2). In one set of embodiments, AOP 214 converts serial audio data received via SPI 112 into an analog audio signal, and amplifies the analog audio signal using a high efficiency, class-D headphone driver. RBP 116 may include a Radio Transceiver block 218, a Digital Baseband and Processing component 226 (which may include a CPU and/or Microcontroller, as well as memory elements/registers), a POR block 220, and an SPI 224 to exchange data and information with PMA 114.

The state of PMA 114 may be controlled by digital input data through register writes. The digital input data may be delivered as low duty-cycle data, and may be provided into a register bank (not shown) inside PMA 114 by way of SPI 212. Since SPI 212 may be a bidirectional interface, it may also be used to read the state of the register bank. This capability may facilitate the reading of low duty-cycle digital outputs for the purpose of testing. The digital circuitry in PMA 114 may operate on two clock domains. The incoming SPI_CLK may be used to clock data into an SPI Receive FIFO (not shown) within SPI 112, and out of the SPI Transmit FIFO (not shown) also within SPI 212. The remainder of the digital circuitry, which may include registers, Finite State Machines, the Read Port of Receive FIFO, and the Write Port of the Transmit FIFO) may be clocked by an internal clock (Mclk). The core of SPI 212 may be used to retime signals between the two clock domains. The reset for the circuitry SPI 212 may be completely asynchronous, in which case no clock is used during reset. Registers may reset to their default values, to ensure that analog components remain inactive. The circuitry of SPI 212 (and also that of FSMs) may remain enabled (i.e. it may reset to an enabled state), while the clocks may run during SPI operations.

PMA 114 may receive a specified digital audio signal, e.g. a 16-bit Pulse Code Modulated (PCM) audio signal through its serial audio port. The digital audio data may be digitally filtered and up-sampled to a specified Audio CLK frequency, and modulated by Multi-loop Noise Shaping (MASH) in the digital audio codec. In some embodiments, the MASH may be a 2-1, 4-bit implementation. The filtered, up-sampled, and modulated data (in case of a 4-bit implementation, the 4 data bits) may drive the input of a dynamic element matcher (DEM), the output of which may be provided to an analog section of PMA 114. PMA 114 may be implemented with four clock domains. The four clocks may include a master clock Mclk, an audio clock AudioClk, a DC-DC converter clock clkDCDC, and an SPI clock SPI_CLK. All clocks may be derived from a specified crystal frequency (e.g. 22.5792 MHz, in some embodiments), or an audio clock Phase Locked Loop (PLL) output frequency (e.g. 24.576 MHz in certain embodiments). The AudioClk may be derived by passing the Mclk through a divide-by-two circuit. The AudioClk may drive the DEM and the audio digital to analog converter (DAC). Mclk may be generated by the system clock of RBP 116. Mclk may also be used for much of the digital SPI circuitry, including all registers and any SPI FSM. The branch of the clock tree provided to SPI may be gated, and may toggle only during SPI data transfers. The SPI clock may be synchronous with the Mclk. The DC-DC converter clock may be synchronous to the Mclk, and may default to the AudioClk frequency, to mix power supply noise, possibly generated by the DC-DC converter block within PMB 206, to DC, in order to eliminate any negative impact on audio dynamic range.

PMA 114 may power up in a low power mode, in which all analog blocks may be disabled, and digital components/circuitry may not be toggling. To accomplish this, POR block 208 within PMA 114 may generate a POR signal that forces PMA 114 into a known low power state as soon as the supply voltage VDD3V is valid. Note that in order to simplify the block diagram in FIG. 2, clkDCDC and AudioClk are not shown. During power-up the DC-DC converter may be in full standalone mode, its clock generated locally at start-up. In general, the DC-DC clock may not be involved with the digital core of PMA 114. PMB 106 may be standalone to provide the choice of using either external charger and DC-DC converter, or onboard/on-chip charger/DC-DC converter for battery charging and switching regulator functions. The user may also have the option of using onboard/on-chip DC-DC and external charger, in case batteries other than Li+ ion batteries are used. The functionality of PMB 106 may be controlled through a software algorithm, which may be executed for example by processing unit 106 of FIG. 1, or the CPU inside Digital Baseband and CPU block 226 of RBP 116, or possibly by a microcontroller/processing element within PMB 206.

In various embodiments, AOP 214 may include a Class-D headphone driver featuring a switching amplifier that uses Natural Sampling Pulse Width Modulation (PWM) to convert an analog input into a series of Rail-to-Rail pulses. The audio signal may be encoded in the average value of the PWM pulse train and may be recovered from the PWM signal by analog low pass filtering at the headphone. Switching amplifiers are known to be efficient (especially if zero voltage switching techniques are used) since voltage drop across the amplifier output stage can be kept low while delivering current to the load. However, switching amplifiers are also known to have impairments that degrade linearity and signal to noise ratio (SNR). Specifically, power supply pushing/glitching and crossover distortion are signal dependent non-idealities that contribute to total harmonic distortion (THD) in audio Class-D amplifiers. In one set of embodiments, a Class-D headphone driver may be designed with a negative feedback network to compare the output signal with the input signal and suppress non-idealities introduced by the Class-D switching stage, and may perform $2^{nd}$ order noise shaping via the DEM element (not explicitly shown) to reduce noise at low power operation.

Figure 3:
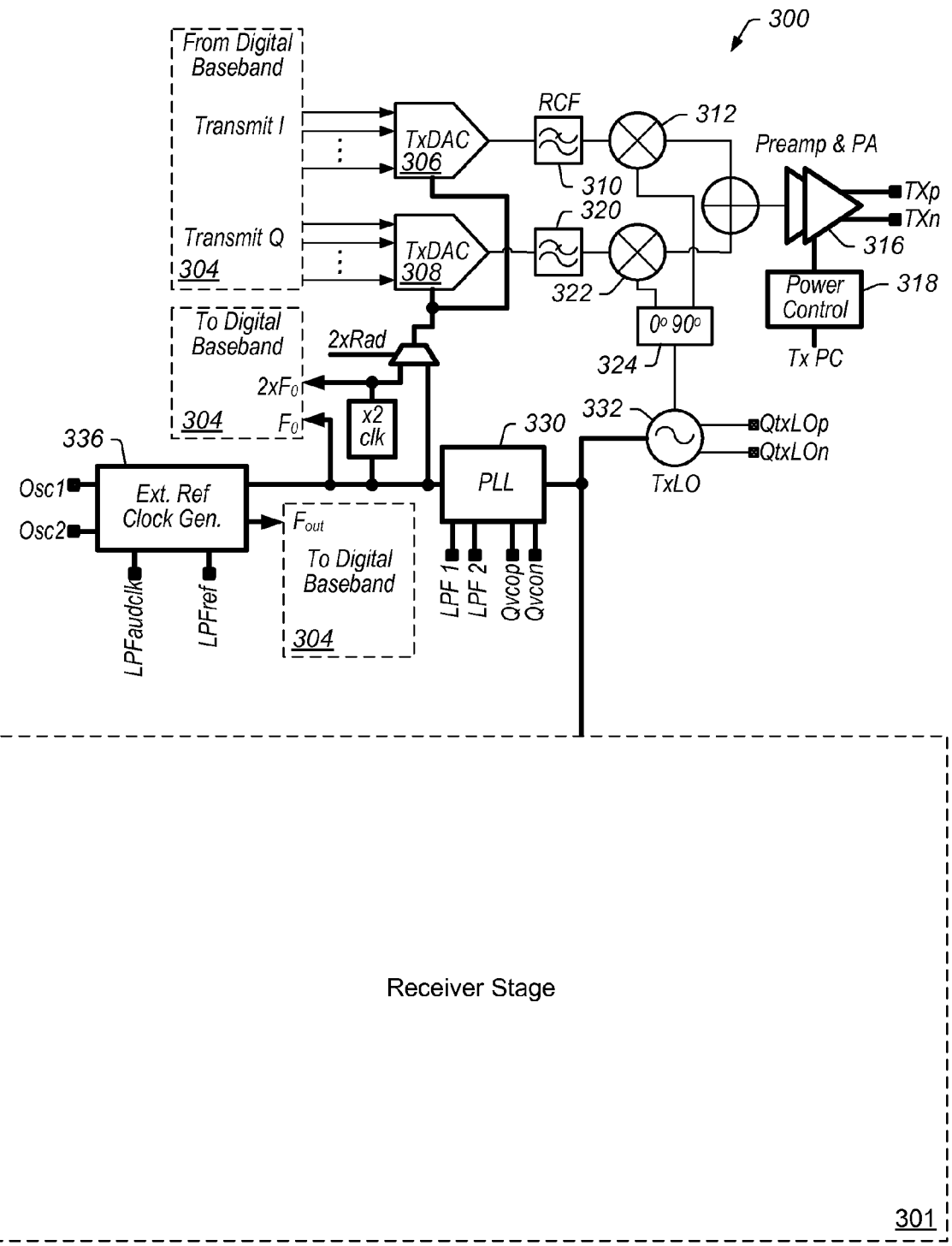
FIG. 3 shows the partial block diagram of one embodiment of the Radio portion of the RPB block of the RF transceiver system of FIG. 2.

FIG. 3 shows the circuit diagram of one embodiment of Radio block 218 from RPB 116. The embodiment shown in FIG. 3 includes a transmitter stage 300, and a receiver stage 301. A transmit "I" and a transmit "Q" signal are provided from digital baseband circuitry 304 to digital-to-analog converters (DACs) 306 and 308, respectively, for transmission via amplifier circuitry 316 operating under power control 318. Quadrature modulation is performed by mixers 312 and 322, which are operated according to quadrature signals based on the output of Transmitter Local Oscillator (TxLO) 332, fed through phase shifter 324 to provide the quadrature phase shift. The outputs from DAC 306 and DAC 308 each pass through respective RC filters 310 and 320 before reaching respective mixers 312 and 322. A reference clock generation circuit 336 is used to provide a square wave signal as first base frequency $F_0$ (e.g. a low frequency of approximately 22.5 MHz) periodic signal to phase-locked loop (PLL) 330. Circuit 336 is also used to provide a base frequency $F_{out}$ periodic signal to digital baseband circuitry 304. TxLO 332 may be an injection locked oscillator controlled from PLL 330. Any numeric values provided with respect to the RF system shown in FIG. 3 are exemplary, and various embodiments are not meant to be limited to the specific values provided herein. In one set of embodiments, power control block (PCB) 318 may be configured to execute a transmit power control algorithm to control power on both source and sink side operation of transmitter stage 300.

In one embodiment, RBP 116 is divided into three functional portions: Digital and Analog IO Pads, Analog Design blocks, and a Digital Core. RBP 116 may have two main "modes" of operation: a Source Mode and a Sink Mode. Source and Sink Mode are in reference to the direction of audio travel, but may also be indicative of the clock synchronization. A Source device may receive an audio stream from an external audio source, and send it to a Sink device over a wireless interface. The Sink device, in turn, may pass the audio stream out to a destination. From a clock synchronization perspective, the Source device may contains the "Master" clock and the Sink device may synchronize its oscillator to that Master clock. The Source device may also possibly further synchronize to an external clock signal, but such synchronization would not affect Source and Sink functionality.

Figure 4:
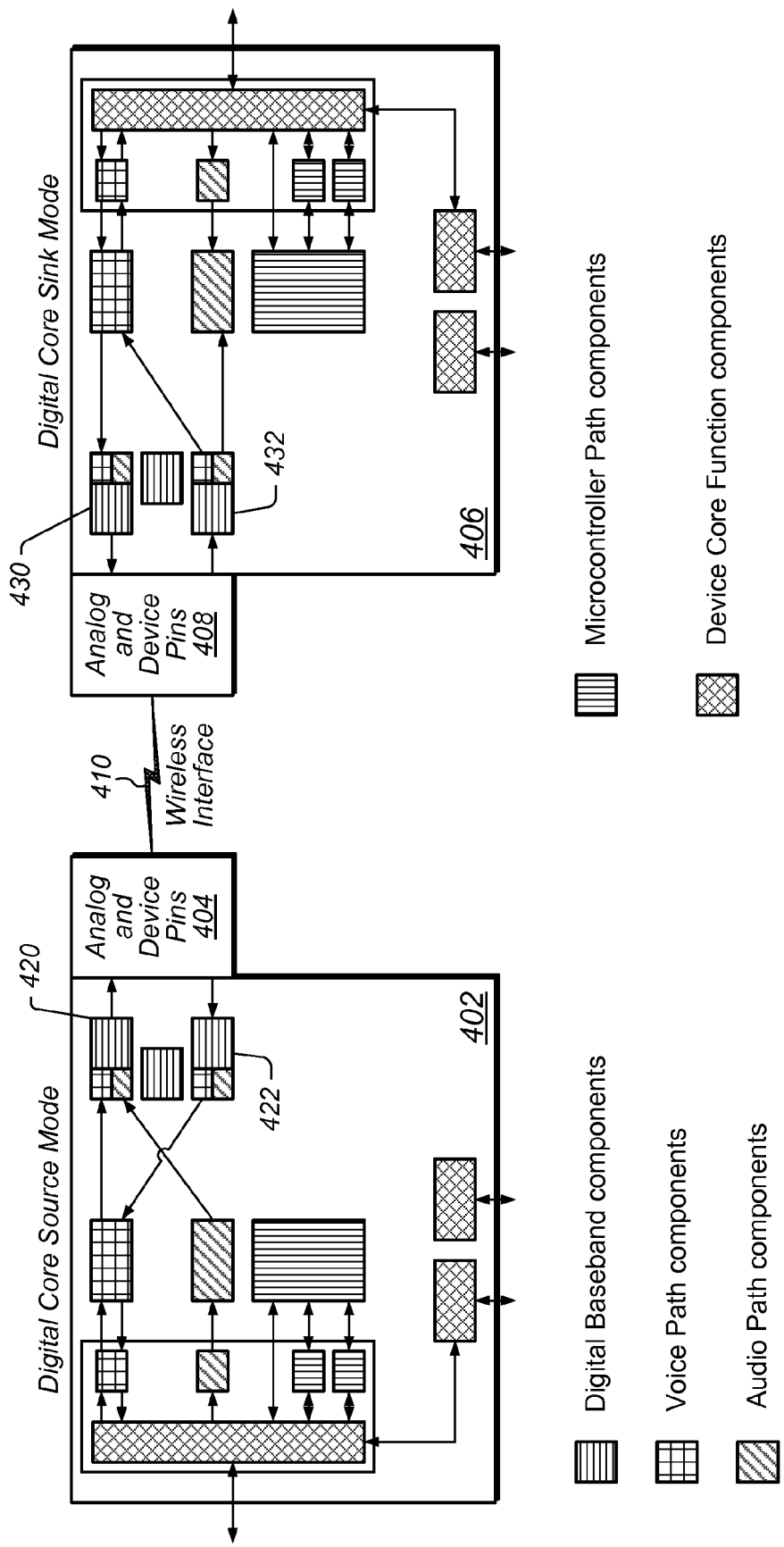
FIG. 4 shows the partial block diagram of one embodiment of the digital core of the RPB block of the RF transceiver system of FIG. 2.

With respect to Source and Sink devices, the expressions "Ingress" and "Egress" are oftentimes used. Ingress refers to the direction of data towards the wireless interface, and Egress refers to circuits controlling or processing data flowing away from the wireless interface. For example, a Source chip may therefore carry Ingress Audio, while a Sink chip may carry Egress Audio. A simplified diagram of one possible Source and Sink pairing is shown in FIG. 4. Blocks 402 and 404 are partial block diagrams showing the high level organization of certain functional blocks in one embodiment of the digital core of RPB 116, operating as a Source. Similarly, blocks 408 and 406 are partial block diagrams showing the high level organization of the functional blocks in the same embodiment of the digital core of RPB 116, operating as a Sink. Source and Sink pairing may be established over wireless (RF) interface 410. The functional blocks within blocks 402 and 406 represent functional groups.

As listed in FIG. 4, the digital functional groups may include Digital Baseband components, Voice Path components, Audio Path components, Microcontroller components, and Device Core Function components. Ingress direction is towards the device pins from the transmit baseband components, specifically from transmit baseband 420 to pins 404, and from transmit baseband 430 to pins 408. Conversely, Egress direction is from the pins to the receive baseband components, specifically from pins 404 to receive baseband 422, and from pins 408 to receive baseband 432. In one set of embodiments, the voice path may be full duplex, i.e., both directions may operate at the same time, while the Audio path may only be receiving or transmitting to the Radio during a mode of operation. The Audio may be transmitting to the Radio in Source Mode and may be receiving in Sink Mode. As mentioned above, data path directions are referred to herein as Ingress and Egress with the Radio (RF transceiver) operating as the reference point.

As shown in FIG. 4, RBP 116 may contain several core functions, illustrated in devices 402 and 406. These core functions may be used to facilitate operation of the higher level data path functions. Examples of this include selecting PAD functionality, reset functions and clock functions. The audio path may take audio data from a Source/Ingress Device Serial Audio Interface (SAI) and may transport it to a Sink/Egress Device and out through the Sink/Egress Device SAI. Programmability may be available on the external audio interfaces (external SAI) of both devices to allow the SAI to interface with a variety of external devices. The Audio Path may also employ a number of strategies to handle power, latency and interferences issues. The Voice path may be bidirectional. It may allow full duplex voice communication across the devices. Each device (such as device 402 and 406) may have an ingress voice path that takes voice data from its programmable Serial Voice Interface (SVI) and may transport it to its paired device, from which it is sent out the egress SVI. This path may employ a number of strategies to handle power, latency and interferences issues. The Microcontroller may support several interfaces, such as GPIO, SPI, TWI, etc.

The Digital Baseband may provide the digital portion of the RF Transceiver. In the ingress direction it may take the digital signaling and process it to be sent to the analog portion of the RF Transceiver. In the egress direction, it may process the signal and recover the original packet created by the ingress radio. The ingress Digital Baseband is referred to as the TX Baseband, and the egress direction it is referred to as the RX Baseband. The Sequencer and Time Synchronization Function (TSF) are functions of the Baseband that allow automation and synchronization of both Basebands relative to their paired device.

Transmit Power Control

Figure 5A:
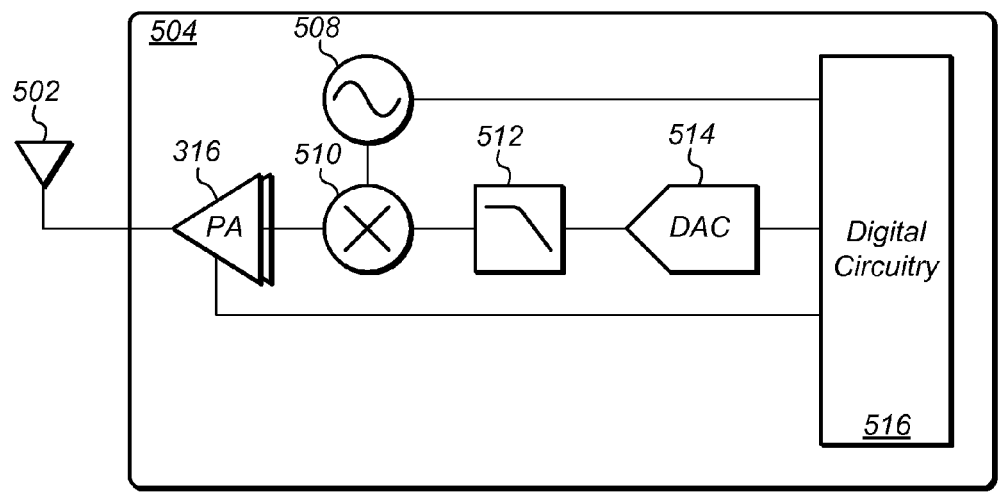
FIG. 5a shows a partial circuit diagram of one embodiment of the Power Control block in the embodiment of Radio portion of the RPB block in FIG. 3.

As shown in FIG. 3, the transmit amplifier (and pre-amp when applicable) may be under control of a Power Control block 318. Transmit power control is performed to control the PA output power to improve the power consumption of the system. In one set of embodiments, two different systems applications may feature different PA power control mechanisms. A first system may include module PA power control, and a second system may include an extended range PA power control. FIG. 5a shows the basic block diagram of one embodiment of a module PA output power control block 504, which may represent one embodiment of Power Control block 318 together with amplifier 316. The output power level of PA 316 may be adjusted by digital circuitry 516, which may generate a control signal passing via DAC 514 and Low Pass Filter (LPF) 512, mixed by mixer 510 using oscillator 508. In one set of embodiments, the power level may be adjusted in specified step increments, from a specified lowest value to a specified highest value. For example, the output power of PA 316 may be adjusted in 5 dBm increments from −40 dBm to −5 dBm, and from there between −2 dBm and +2 dBm using another specified step size. The power levels may vary between various different specified embodiments of RBP 116 (or between various different devices as exemplified by device blocks 402 and 406 in FIG. 4.

Figure 5B:
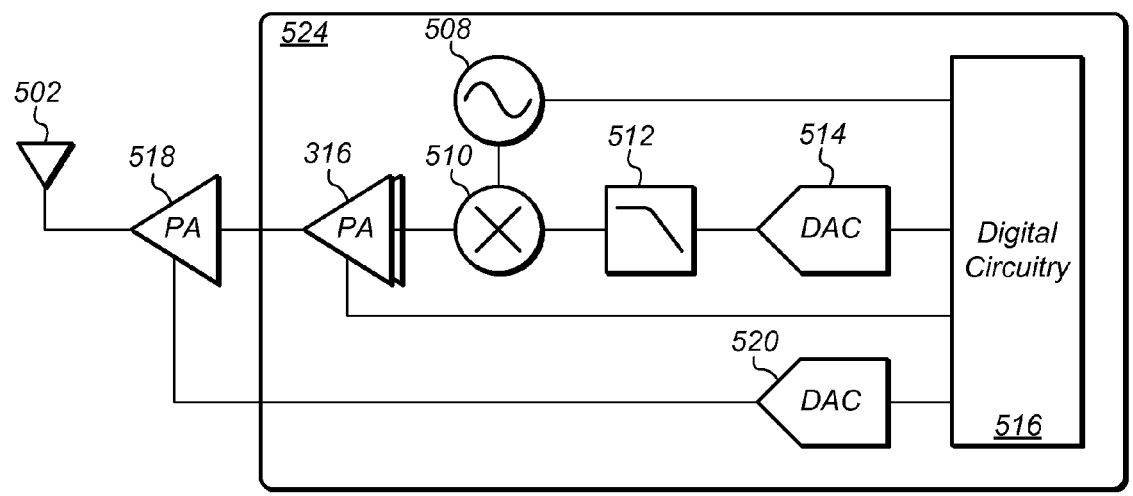
FIG. 5b shows a partial circuit diagram of one embodiment of the Power Control block in the embodiment of Radio portion of the RPB block in FIG. 3 for extended range power amplification.

An embodiment of an extended range PA power control block 524 is shown in FIG. 5b, and includes an additional, external PA 518 to boost the output RF power of the module up to a specified value, e.g. 20 dBm. The higher output RF power may enable devices that implement it to work over greater distances than devices that use only PA 316. However, the added external PA 518 may also consume a great deal of power. Both the module PA power control and extended range PA power control, including control of external PA 518 may be performed via an internal Microcontroller executing programming instructions within the Digital Baseband and CPU block 226 shown in FIG. 2, and also in devices 402 and 406 as part of the Microcontroller Path components. In that case, Digital Circuitry 516 is meant to reference those components as being responsible for generating the control signal provided to DAC 514. In order to save power, PA 316 may be set to a lower level whenever possible. For some embodiments, this may require power control on both Sink (SNK) transmitters and Source (SRC) transmitters. Extended range applications employing an external PA (e.g. PA 518) may result in a slightly different Transmit control algorithm implementation for module PA power control and extended range PA power control.

Transmit Power Control Algorithm

In one embodiment of a Transmit Power Control (TPC) algorithm, the SRC may determine the desired SRC power level by measuring the received signal (from SNK) level, and indirectly measuring the path loss. The SRC may assume that the path loss is the same for both paths, i.e. for SNK-SRC and SRC-SNK. In one embodiment, power control is only performed on the SRC because the SNK may be in transmit mode for less than 10% of time, which means that Transmit power control may have minimal impact on overall power consumption. As mentioned above, PA 316 may have a specified number of steps (e.g. 8) of a specified step size (e.g. −5 dB), from a specified minimum value (e.g. −40 dBm) to a specified maximum value (e.g. +2 dBm— where the maximum power step may be varied from −2 dBm to +2 dBm). If the SRC does not receive Acknowledgment feedbacks (ACKs) from all SNKs during any given TSF (i.e. a packet error occurs), it may automatically increase the PA power by the specified step amount (e.g. by 5 dB). If the SRC receives a specified number (e.g. 20) good TSFs in a row (which, in some embodiments, may be twenty to eighty good ACKs depending on the number of SNKs), and if the minimum Received Signal Strength Indicator (RSSI—i.e. energy level) of the ACKs and the current SRC Transmit power is greater than a preset threshold level, then it may decrease the PA power by the specified step amount.

Transmit Power Algorithm with SRC and SNK Information Exchange

Figure 6:
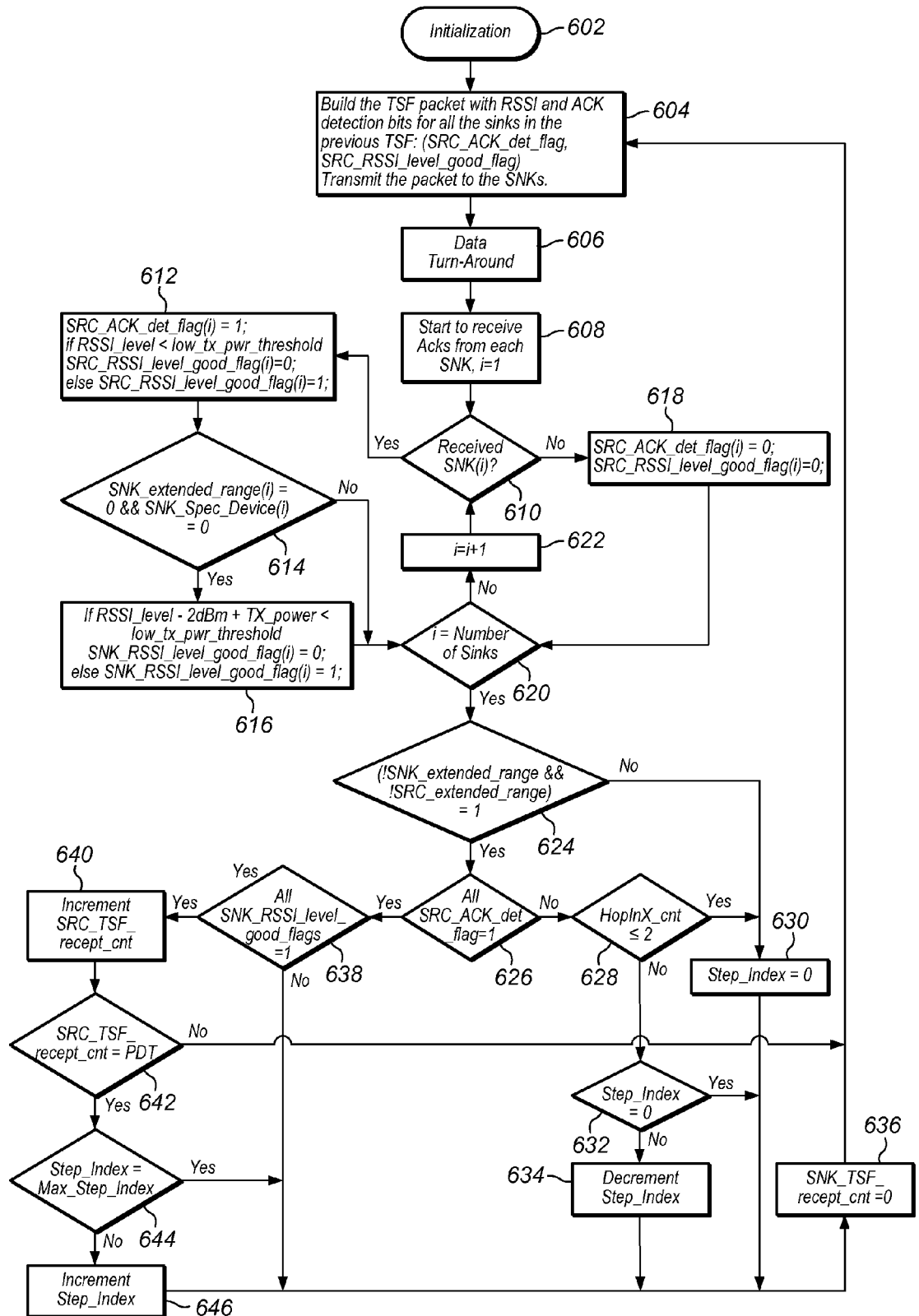
FIG. 6 shows the flowchart for one embodiment of a source side transmit power control algorithm.
Figure 7:
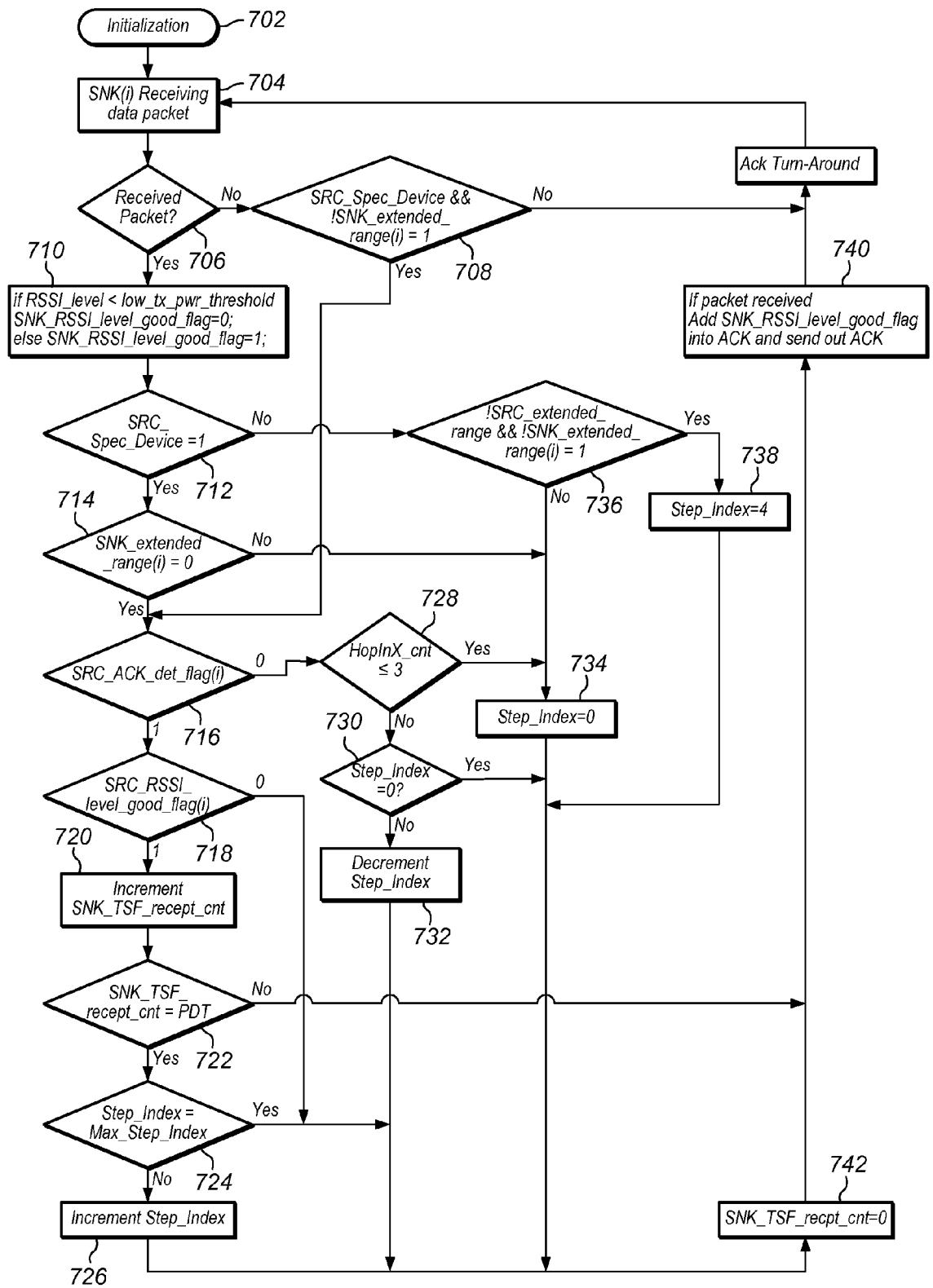
FIG. 7 shows the flowchart for one embodiment of a sink side transmit power control algorithm.

The TPC algorithm shown above may facilitate saving power on the SRC side, however, it may not provide sufficiently efficient control when Transmit power control is used on a SNK transmitter due to the transmitter's higher PA power consumption. Hence, an alternate embodiment of the TPC algorithm may be devised to meet the requirements as set forth above. In one set of embodiments, as part of the TPC algorithm, SRC and SNK devices may exchange RSSI and packet reception information with each other. Because SNKs may only send out an ACK when a packet is received, the SNK may only need to transmit RSSI info to the SRC while the SRC transmits RSSI and ACK reception information to the SNKs. The Source Side operation of one embodiment of an alternate TPC algorithm is shown in a flow chart in FIG. 6, and Sink Side operation of one embodiment of the alternate TPC algorithm is shown in a flow chart in FIG. 7. The description of the various state variables shown in FIGS. 6 and 7 are respectively described in the tables shown in FIGS. 8a and 8b.

Source Side Operation; FIGS. 6 and 8a

The algorithm may begin with initialization (602), and defining initial values for various variables, thresholds, Transmit power range and step sizes, Packet/ACK counters and counter threshold (604). Following the data turn-around (606), the SRC may start to receive ACKs from the SNKs, beginning with a first SNK (608). For Each TSF (which may not include TSF's that are to be skipped), the SRC may include the required information on the reception of the ACKs from each SNK in the previous non-skipped logical TSF, into the data packet to be transmitted to the SNKs (note: when using ACK first TSF timing, ACKs may be included in the same physical TSF as the data packet). The information on each given SNK may include whether the SRC has received the ACK from the given SNK (that is, the '$i^{th}$' SNK), and if received, whether the RSSI level from the given SNK is below the threshold level.

The SRC may set the flags (in 612) for each of the ACKs that have been correctly received from the corresponding SNKs ('Yes' branch of 610). For each of the received ACKs ('Yes' branch of 610), the SRC_RSSI_level_good_flag(i) may be set to 0 (in 612) if the RSSI level is below an expected threshold, e.g. low_tx_pwr_threshold=−60 dBm). The SNK ACK reception counter may be incremented (640) if all the ACKs have been correctly received and all the SNK_RSSI_level_good_flags carried in the ACKs from the SNKs are set (path of 612, 614/616, 620, 624, 626, 638, 640). Otherwise, the SNK ACK reception counter may be reset to zero (636, from the 'No' branch of 638). If the SNK ACK reception counter is equal to a specified Power Decrement Threshold (PDT) value, which may be a stored value having a specified default value ('Yes' branch of 642), the step index may be incremented by 1 (i.e. the Transmit power may be decreased; 646 from the 'No' branch of 644) unless it is already at the maximum step index ('Yes' branch of 644). Also, the SNK ACK reception counter may be reset to zero (636).

If any ACKs are not received in a given TSF ('No' branch of 626) and the HopInX_cnt on the SRC is less than or equal to a specified value, e.g. 2 on the next transmission ('Yes' branch of 628), then the step index may be set to a specified value (e.g. 0) corresponding to going to maximum power before switching channels, to try and recover the channel if possible (630). If any ACKs are not received in a given TSF ('No' branch of 626) and the HopInX_cnt is greater than the specified value on the next transmission ('No' branch of 628), then the step index may be decreased by a specified step increment, corresponding to increasing the Transmit power (634, from the 'No' branch of 632) unless the step index is already at the specified value ('Yes' branch of 632). In either case, the SNK ACK reception counter may subsequently be reset to zero (636). To ensure HopInX is ready for the next transmission, Transmit power control may continue to run after channel switching.

In one set of embodiments, a typical increment/decrement step size for the power may be set to 5 dB when the PA power is at step 6 (0 dBm) or below. Furthermore, the typical increment/decrement step size may be set to be 2 dB when the PA power is above step 6. The smaller step size may be used above the 0 dBm step to try and minimize the Transmit power consumption as it increases rapidly above +2 dBm.

Sink Side Operation, FIGS. 7 and 8*b*

Similar to the SRC side operation, the Sink side algorithm may begin with Initialization (702), and defining initial values for various variables, thresholds, Transmit power range and step sizes, Packet/ACK counters and counter threshold. For each TSF that has not been skipped, the SNK may start to receive the data packet from the SRC (704). Upon the correct reception of the packet ('Yes' branch of 706), the received packet RSSI level may be checked, and if the RSSI level is below an expected specified threshold, (e.g. low_tx_pwr_threshold=−60 dBm), the SNK_RSSI_level_good_flag is set to 0, otherwise it is set to 1 (710), and the flag bit is included in the ACK sent to the SRC for SRC Transmit power control. If the data packet from the SRC is correctly received and the ACK detection flag from the SRC for that SNK is set ('Yes' branch of 716), and the SRC_RSSI_level_good_flag for that SNK is set in 710, increment the SRC ACK reception counter (720, through path 706, 710, 712, 714, 716, and 'Yes' branch of 718). Otherwise, reset the SRC ACK reception counter to zero (742, through path 706, 710, 712, 714, 716, and 'No' branch of 718).

If the data packet from the SRC is not received ('No' branch of 706), or if the data packet from the SRC is correctly received and the ACK detection flag from the SRC for that SNK is not set ('No' branch of 716), then the HopInX_cnt may be determined (728). If the HopInX_cnt for that SNK is less than or equal to a specified number, e.g. 2, on the next TSF—i.e. SRC transmission—('Yes' branch of 728), the step index may be reset to 0, corresponding to going to maximum power before switching channels, to try and recover the channel if possible (734), and the SRC ACK reception counter may also be reset (742). To ensure HopInX is ready for the next transmission, the Transmit power control algorithm may continue to run after channel switching. If the HopInX_cnt for that SNK is not less than or equal to the specified number ('No' branch of 728), and the step index isn't already at zero ('No' branch of 730), the step index may be decreased, e.g. by 1, corresponding to increasing the Transmit power (732). If the step index is already at 0 ('Yes' branch of 730), the SRC ACK reception counter may be reset (742).

Subsequent to having incremented the SRC ACK reception counter in 720, if the SRC ACK reception counter is equal to the (Power Decrement Threshold) PDT ('Yes' branch of 722), and the step index is not already at the maximum value ('No' branch of 724), the step index may be incremented, e.g. by 1, corresponding to decreasing the Transmit power (726). If the step index is already at the maximum value ('Yes' branch of 724), and also subsequent to having incremented the step index, the SRC ACK reception counter may be reset (742).

Extended Range Operation

In the embodiments shown in FIGS. 6 and 7, if extended range operation is detected, the power is simply maximized by setting the step index to the lowest value, corresponding to increasing the Transmit power. As seen in FIG. 6, upon detecting that either the SRC or SNK operates at extended range power ('No' branch of 624), the step index is set to zero (630). Similarly, in FIG. 7, upon detecting that either the SRC or SNK operates at extended range power ('No' branch of 736), the step index is set to zero (734). It should be noted, that the various combinations of step size values, threshold values, correspondence established between power level and step size, correspondence established between power level and step value, and HopInX value are provided herein as examples, and various embodiments may be configured with different values and correspondences than what is included herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A method for controlling transmit power, the method comprising:
a source device transmitting data to a plurality of sink devices over a wireless Radio Frequency (RF) link;

transmitting, by the plurality of sink devices, acknowledgement messages to the source device over the wireless RF link, wherein the acknowledgement messages are transmitted in response to receiving the data transmitted from the source device;

determining, by the source device, whether acknowledgment messages have been received from each of the plurality of sink devices;

increasing an output transmission power of the source device, if it is determined that acknowledgment messages were not received from all of the plurality of sink devices; and decreasing an output transmission power of the source device, if it is determined that acknowledgment messages were received from all of the plurality of sink devices.

2. The method of claim 1, wherein the source device decreasing its output transmission power comprises the source device reducing its output transmission power only if the RSSI for each given sink device indicating that the signal strength of the signals received from the given sink device is greater than a specified minimum value.

3. The method of claim 1, wherein the source device decreasing an output transmission power comprises the source device reducing an output transmission power only if a current value of the output transmission power is greater than a specified threshold value.

4. The method of claim 1, further comprising the plurality of sink devices interrupting transmitting second power information to the source device when the source device is not transmitting first power information to the plurality of sink devices.

5. The method of claim 1, further comprising:
measuring, by the source device, the strength of the signals from the plurality of sink devices used to transmit the acknowledgement messages to the source device; and
wherein the output transmission power of the source device is decreased only if the strength of each of the acknowledgement message signals is above a predefined threshold.

6. The method of claim 1, further comprising:
transmitting, by the source device, a data packet to each of the plurality of sink devices, wherein the data packet transmitted to a specific sink device specifies whether an acknowledgement message was received from the specific sink device.

7. The method of claim 6, wherein the data transmitted to an individual sink device of the plurality of sink devices further comprises Received Signal Strength Indicator (RSSI) information indicative of the strength of the signals by which any acknowledgment message are received from the individual sink device.

8. The method of claim 7, further comprising:
decreasing the output transmission power of each of the plurality of sink devices, if the RSSI signal strength provided by the source device in the data packet is greater than a specified minimum value.

9. A memory medium configured to store programming instructions executable to:
instruct a source device to adjust its output transmission power according to:
transmit data by the source device to a plurality of sink devices over a wireless Radio Frequency (RF) link; and
receive acknowledgement messages, by the source device, from the plurality of sink devices over the wireless RF link, wherein the acknowledgement messages are transmitted in response to receiving the data transmitted from the source device;

determine, by the source device, whether acknowledgment messages have been received from each of the plurality of sink devices;

increase an output transmission power of the source device, if it is determined that acknowledgment messages were not received from all of the plurality of sink devices; and decrease an output transmission power of the source device, if it is determined that acknowledgment messages were received from all of the plurality of sink device.

10. The memory medium of claim 9, further configured to store programming instructions executable to:
instruct the source device to reduce its output transmission power only if the RSSI for each respective sink device indicating that the signal strength of the signals received from the respective sink device is greater than a specified minimum value.

11. The memory medium of claim 9, further configured to store programming instructions executable to:
instruct the source device to reduce an output transmission power only if a current value of the output transmission power is greater than a specified threshold value.

12. The memory medium of claim 9, further configured to store programming instructions executable to:
transmit, by the source device, a data packet to each of the plurality of sink devices, wherein the data packet transmitted to a specific sink device specifies whether an acknowledgement message was received from the specific sink device.

13. The memory medium of claim 12, wherein the data further comprise
received Signal Strength Indicator (RSSI) information indicative of the strength of the signals by which acknowledgement messages are received from the source device.

14. A wireless device comprising:
a transmit path comprising a power amplifier (PA) for transmitting signals over a wireless Radio Frequency (RF) link wherein the transmit path is used to transmit data from a source device to a plurality of remote wireless devices;
a receive path configured to receive signals over the wireless RF link; and
a power control block configured to adjust an output power level of the PA;
wherein the wireless device is configured to communicate with the plurality of remote wireless devices over the wireless RF link through the transmit path and the receive path, to transmit data to the plurality of remote wireless devices and to receive a one or more acknowledgement message from the plurality of remote wireless devices;
wherein the acknowledgement messages are transmitted by the plurality of remote devices in response to receiving the data transmitted from the wireless device; and
wherein the power control block is configured to increase the output transmission power level of the wireless device, if it is determined that acknowledgment messages were not received from all of the plurality of remote devices; and wherein the power control block is further configured to decrease the output transmission power of the source device, if it is determined that acknowledgment messages were received from all of the plurality of remote devices.

* * * * *